No. 658,173. Patented Sept. 18, 1900.
J. B. FONDU.
MACHINE FOR MOLDING ARTICLES FROM MOLTEN GLASS.
(Application filed Mar. 28, 1899.)
(No Model.) 9 Sheets—Sheet 2.
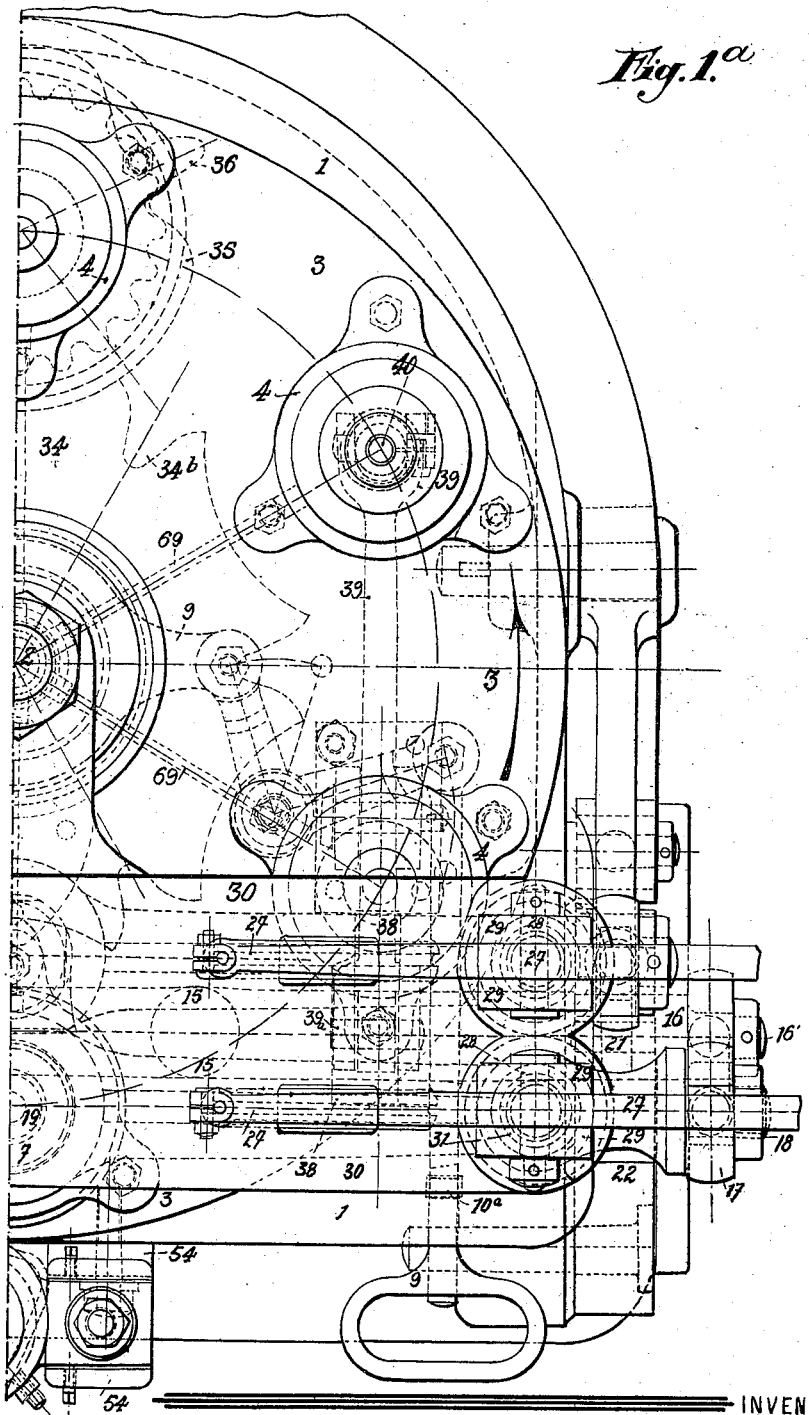
Fig. 1ª
WITNESSES:
Wm. D. Bell.
Robert J. Pallett
INVENTOR.
Jean Baptiste Fondu,
BY
Gartner & Steward,
Att'ys.

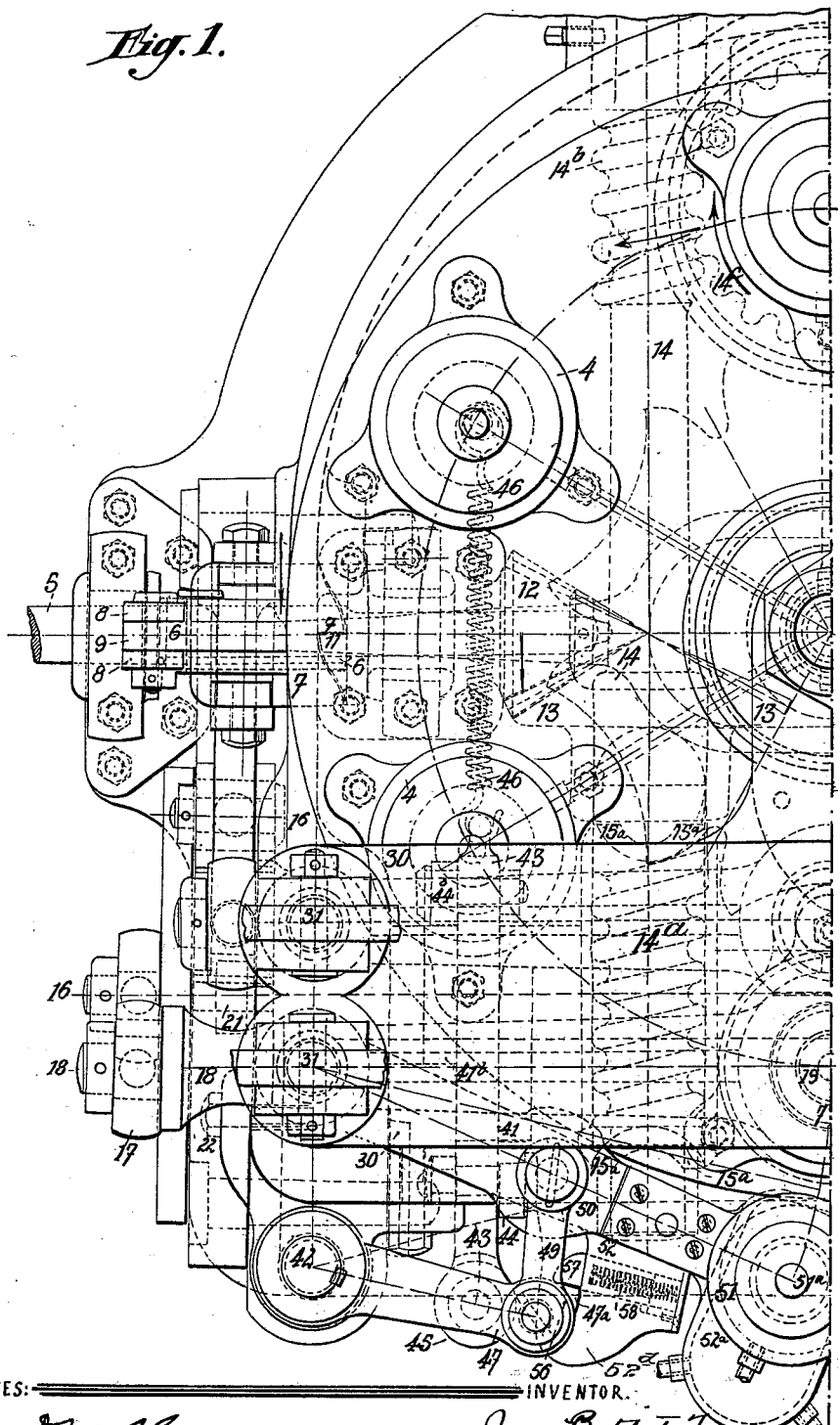

No. 658,173. Patented Sept. 18, 1900.
J. B. FONDU.
MACHINE FOR MOLDING ARTICLES FROM MOLTEN GLASS.
(Application filed Mar. 28, 1899.)
(No Model.) 9 Sheets—Sheet 3.
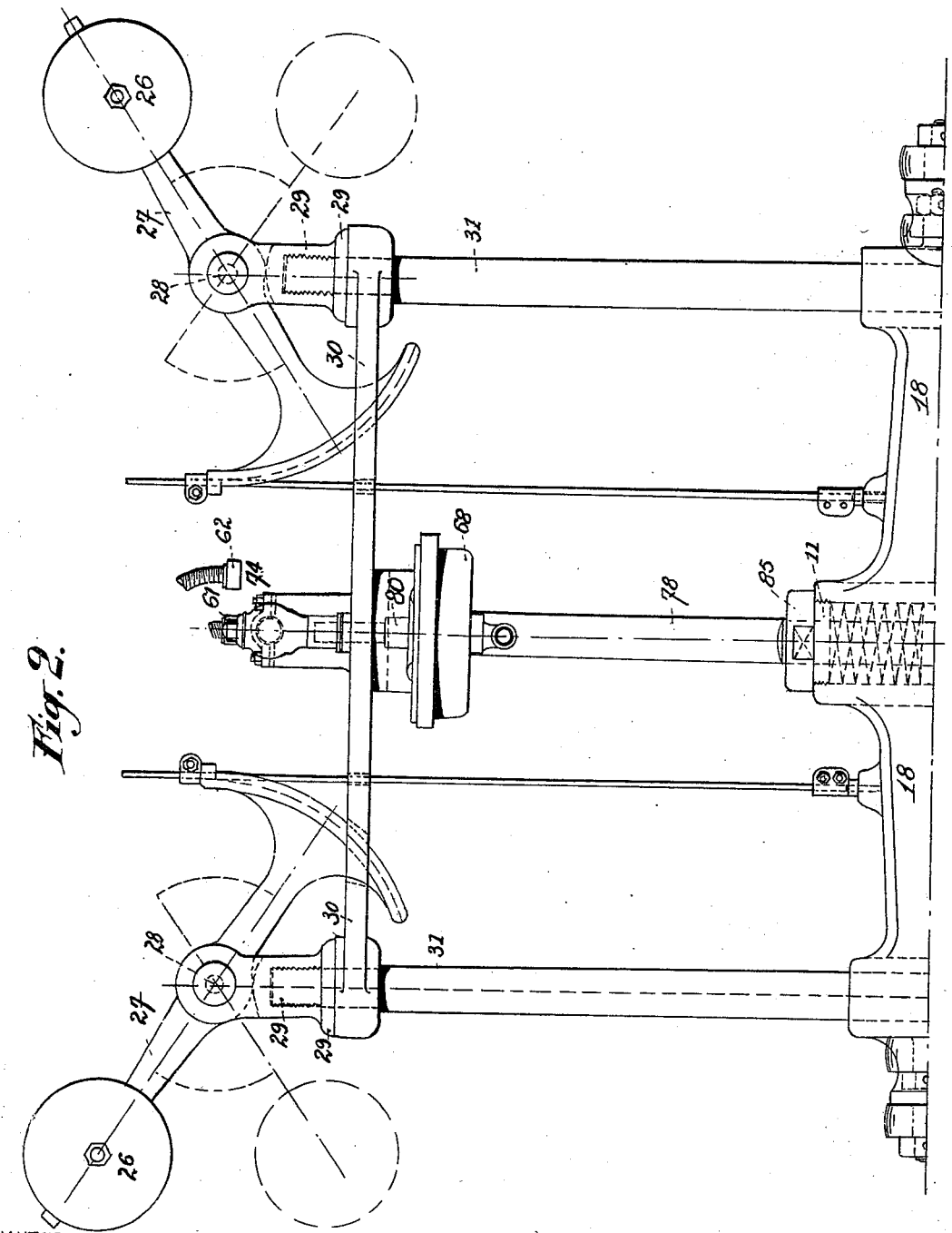

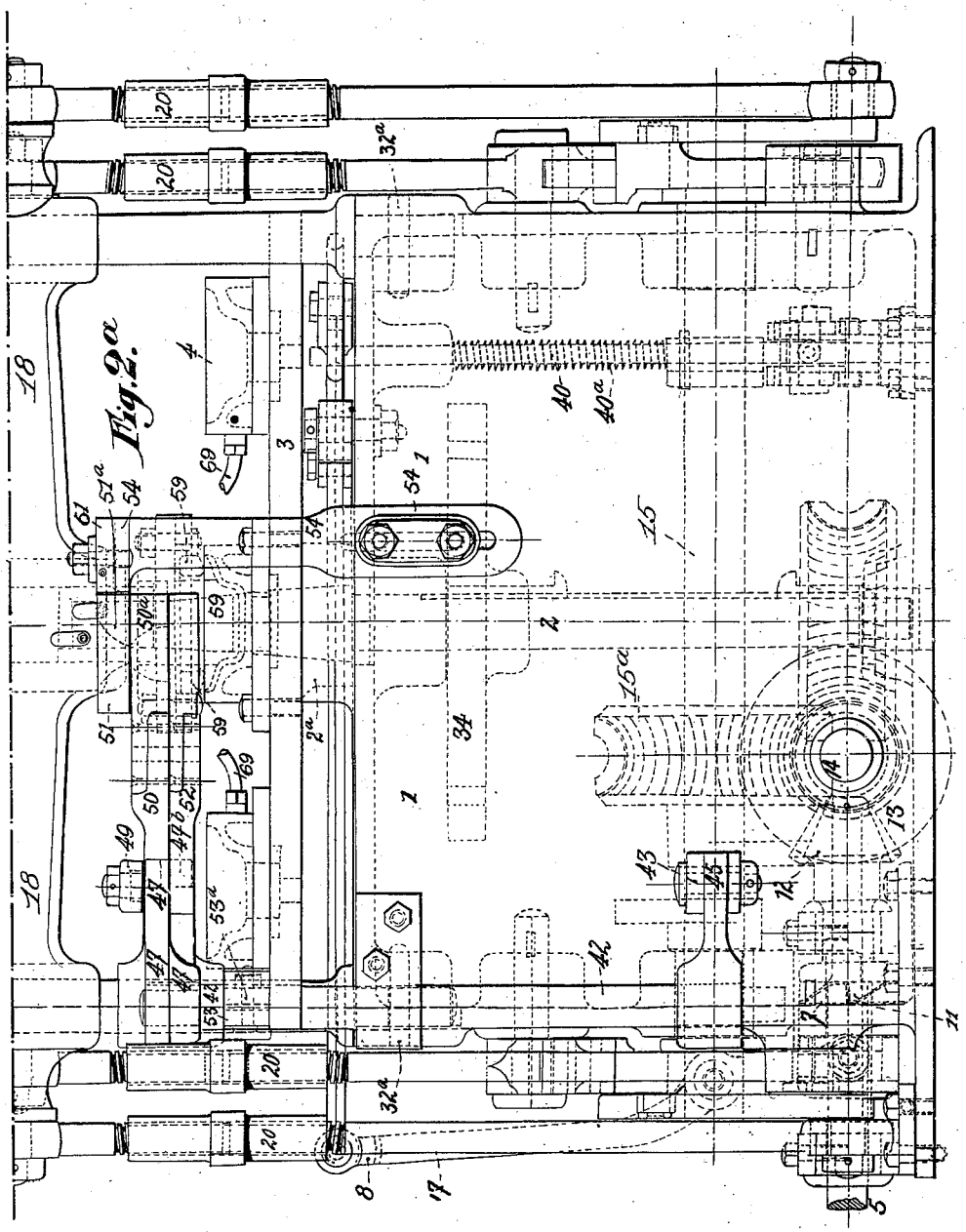

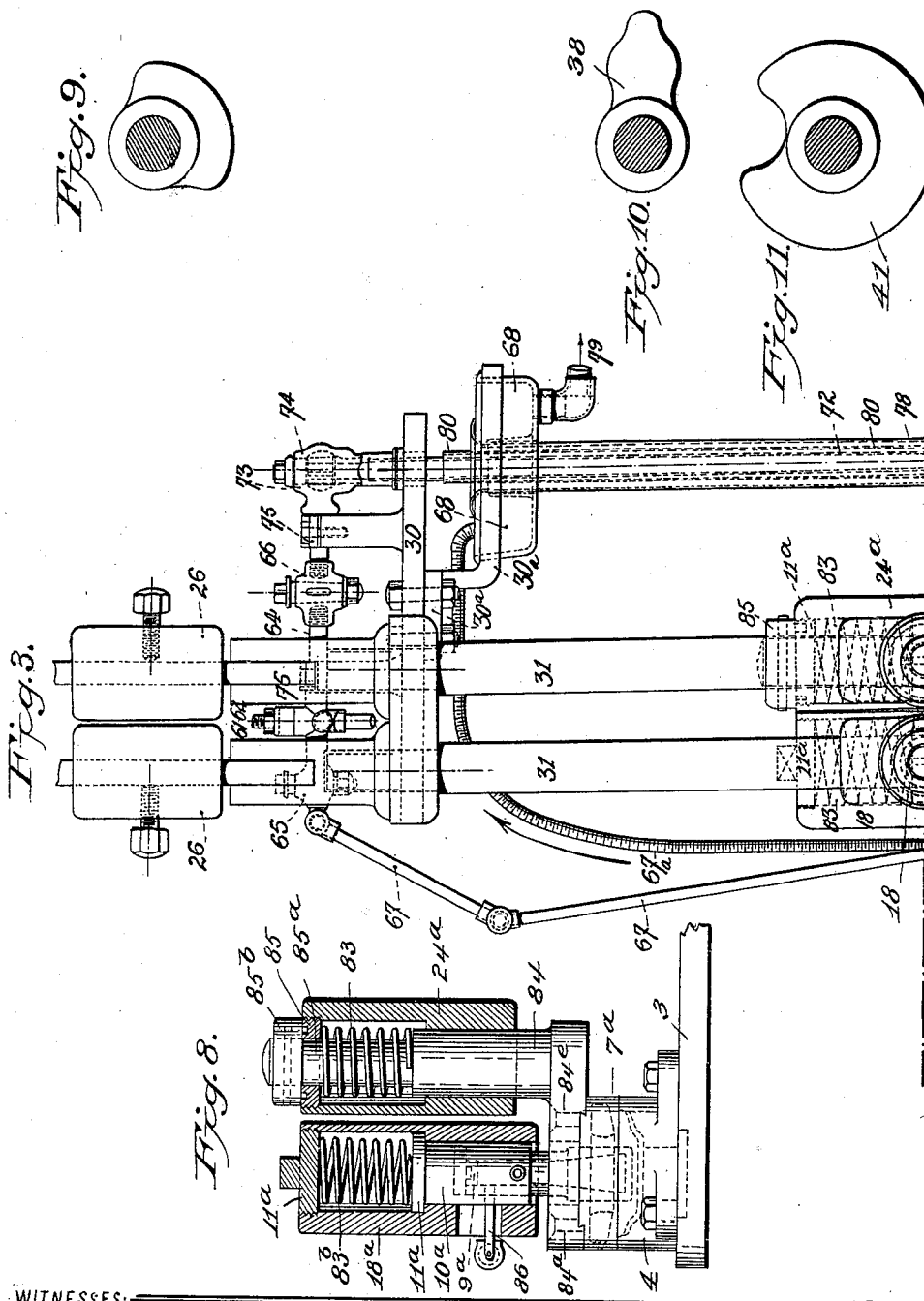

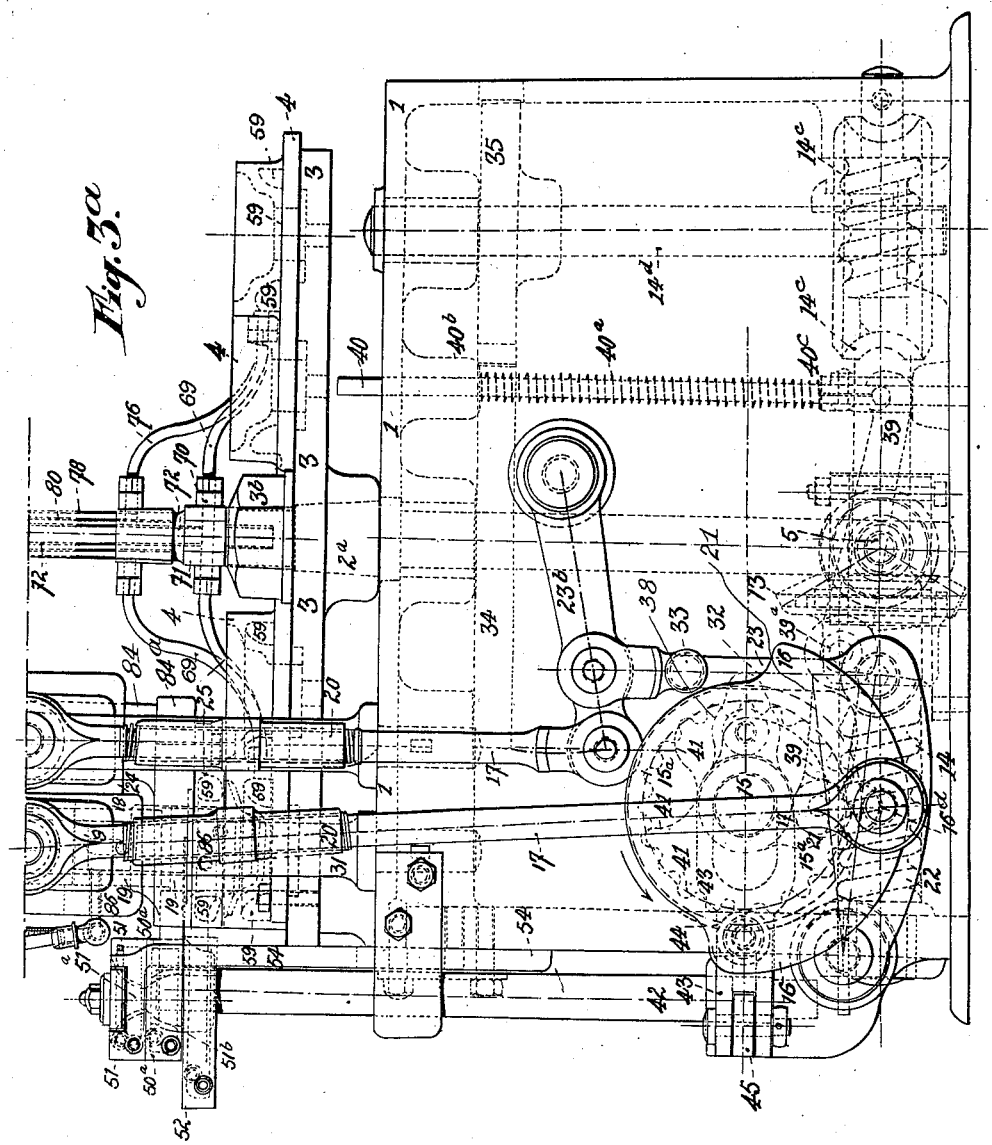

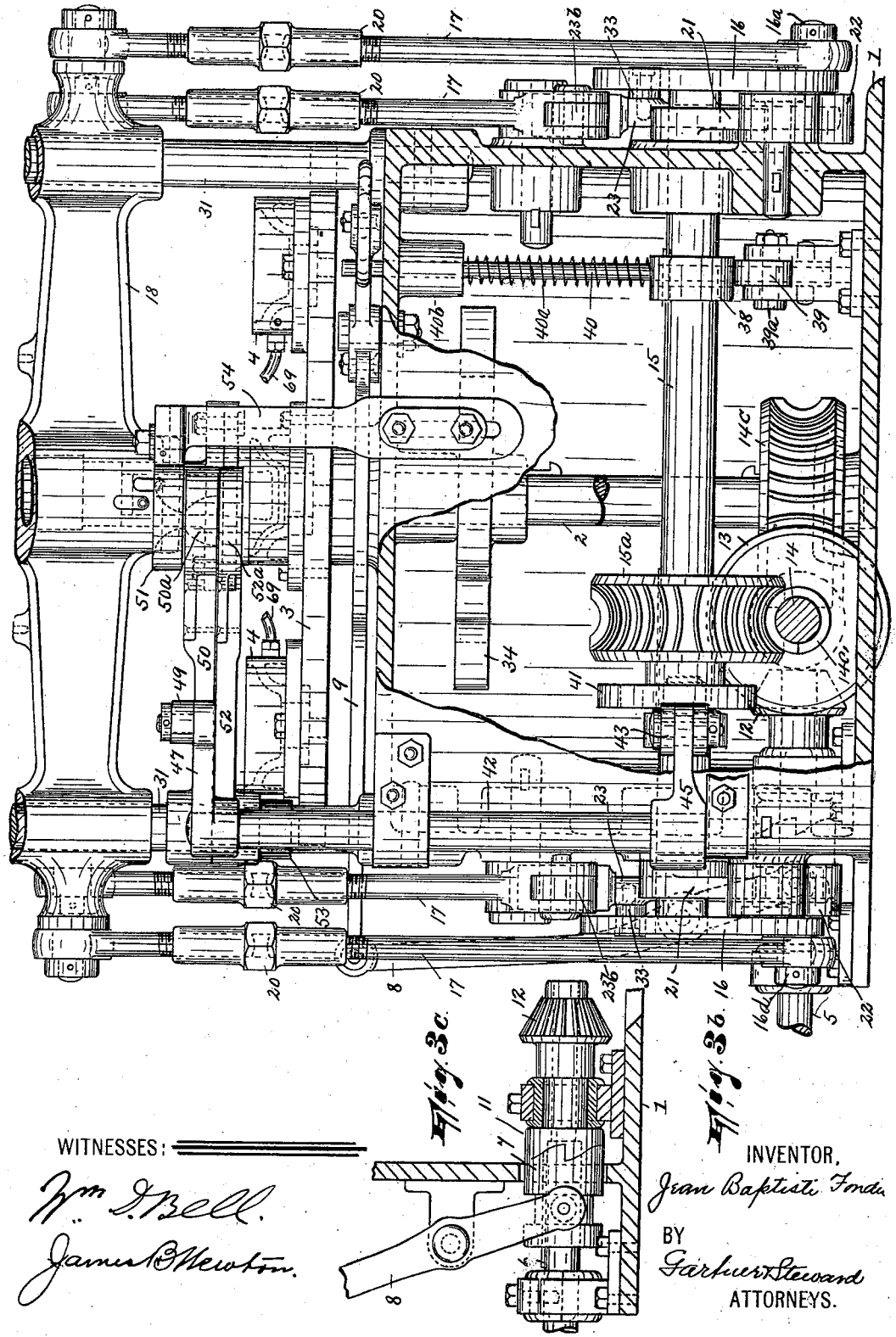

No. 658,173. Patented Sept. 18, 1900.
J. B. FONDU.
MACHINE FOR MOLDING ARTICLES FROM MOLTEN GLASS.
(Application filed Mar. 28, 1899.)
(No Model.) 9 Sheets—Sheet 8.
Fig. 5. (CD).
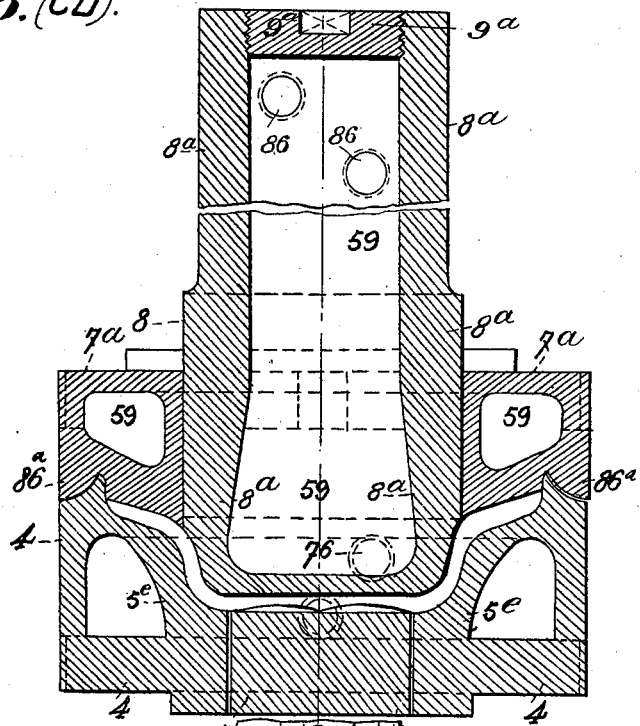
Fig. 4.
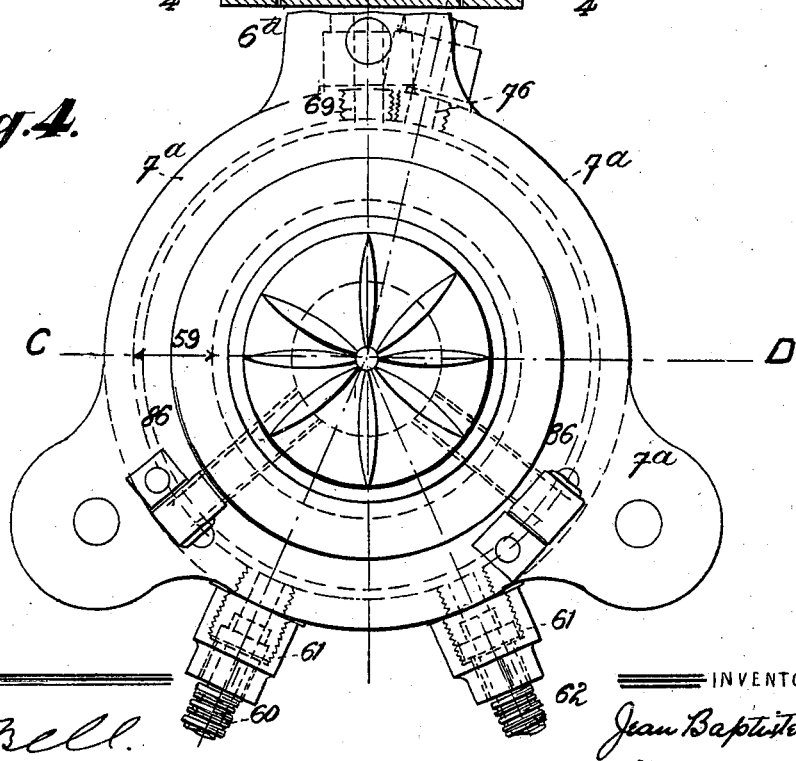
WITNESSES:
Wm. S. Bell.
Robert J. Pollitt
INVENTOR.
Jean Baptiste Fondu,
BY
Gartner & Steward,
Attys.

No. 658,173. Patented Sept. 18, 1900.
J. B. FONDU.
MACHINE FOR MOLDING ARTICLES FROM MOLTEN GLASS.
(Application filed Mar. 28, 1899.)
(No Model.) 9 Sheets—Sheet 9.
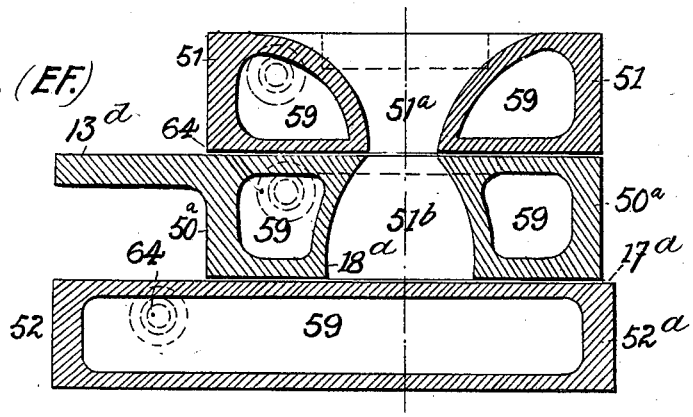
Fig. 7. (E.F.)
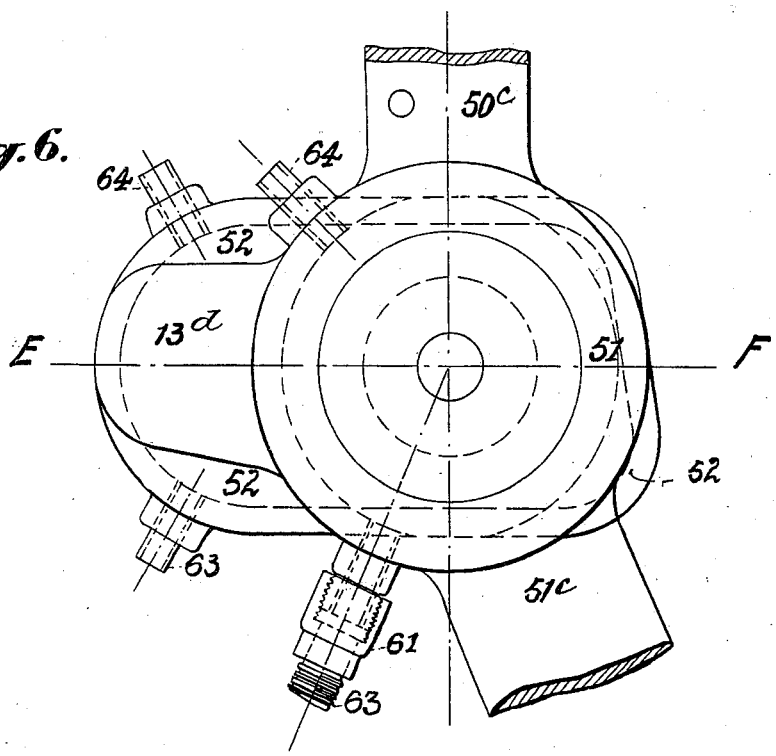
Fig. 6.
WITNESSES: INVENTOR:
Wm. D. Bell. Jean Baptiste Fondu,
Robert J. Pollitt. BY
Gartner Steward,
Atty.

UNITED STATES PATENT OFFICE.

JEAN BAPTISTE FONDU, OF VILVORDE, BELGIUM.

MACHINE FOR MOLDING ARTICLES FROM MOLTEN GLASS.

SPECIFICATION forming part of Letters Patent No. 658,173, dated September 18, 1900.

Application filed March 28, 1899. Serial No. 710,763. (No model.)

*To all whom it may concern:*

Be it known that I, JEAN BAPTISTE FONDU, mechanical engineer, a subject of the King of Belgium, and a resident of Vilvorde, in the Kingdom of Belgium, have invented certain new and useful Improvements in Machines for Molding Articles from Molten Glass and Similar Plastic Materials, of which the following is a clear description.

This invention relates to the manufacture of hollow glass and other similar plastic ware; and it has reference particularly to that kind of apparatus employed in this art which is known as the "molding-press."

For various reasons known to those familiar with the art—such as the danger of damaging the articles while being made on account of too-frequent handling, lack of facilities for maintaining the right temperature in the molds, &c.—hand-presses are undesirable in this kind of molding; and so it is the object of this invention to produce a machine or automatic molding-press which shall be thoroughly efficient in operation and simple and comparatively inexpensive in construction, at the same time involving a reduction in cost of manufacture and the possibility of breakage of the articles while being manufactured.

The invention consists in the improved machine or automatic molding-press and in the combinations of its several parts, substantially as will be hereinafter pointed out and finally embodied in the clauses of the claim.

In the accompanying drawings, Figure 1 is a top plan view of the left half of my molding-machine. Fig. 1$^a$ is a top plan view of the right half of said machine. Fig. 2 is a view in front elevation of the upper portion of said machine. Fig. 2$^a$ is a similar view of the lower portion of said machine. Fig. 3 is a view in side elevation of the upper portion of the machine. Fig. 3$^a$ is a similar view of the lower portion of said machine. Fig. 3$^b$ is a view of the lower portion of the machine, a portion of the frame being broken away to reveal the internal mechanism. Fig. 3$^c$ shows a clutch mechanism for the main drive-shaft. Fig. 4 is a top plan view of one of the molds, showing its cover in position thereon. Fig. 5 is a vertical sectional view of said mold, its cover, and a certain plunger adapted to coact with said mold and the cover to shape the article. Fig. 6 is a top plan view of a certain filling mechanism employed in my machine. Fig. 7 is a vertical sectional view thereof on the line E F in Fig. 6. Fig. 8 is an enlarged view in side elevation, partly in section, of one of the molds, the cover, and plunger and the sustaining means for these parts; and Figs. 9, 10, and 11 illustrate certain cams.

The machine is constructed so as to be used for the molding of all kinds of glassware or ware of plastic material. The molds, the cover, and the punch may be cooled to any required extent, as hereinafter described, by means of passages provided within their respective walls, through which a stream of water is caused to circulate, or they may be heated to the required degree before starting work, steam being passed through the same passages, as in the working of plastic clays, the manufacture of faience ware, porcelain, or like articles, to which material the consistency necessary to preserve them in the shape in which they leave the molds is produced by heat in the molds.

The frame 1 is preferably cast in one piece and receives all the movements of the machine. The rim-flange is broken away to form spaces. In the center rises a vertical shaft 2, on which is secured a circular table 3 by means of a cone 2$^a$, Fig. 2$^a$, and nut 3$^b$, Fig. 3$^a$. The table carries in this instance six molds with circulating-passages. The number of molds, however, is optional. The gearing of the movements is accomplished by means of a shaft 5, worked directly by an electric or other motor or indirectly by means of a belt from some transmission device over a pulley on the said shaft 5, Figs. 1, 2, and 3. On the latter is secured a rib 6, engaging with the ratchet-sleeve 7, actuated by a lever 8, Figs. 2 and 3$^a$, which is moved by means of a rod 9 and held by a finger 10$^a$, which engages in a groove provided for this purpose in the frame 1. (See Fig. 1$^a$.) In this position the ratchet-sleeve 7 is engaged with ratchet 11, which forms part of a pinion 12, engaging with a coupling 13. The latter is secured on a shaft 14, Figs. 1, 2, and 3, provided with a double endless screw, by which means it produces all the movements of the machine. By means of a toothed wheel 15$^a$ engaging with a worm 14$^a$ on the shaft 14 a shaft 15 is revolved, rotating cranks 16 in the shape of cam-plates, Fig. 3ª, and secured on said shafts. These cam-plates carry crank-pins 16$^d$, to which are connected rods 17, by which the rising and falling actions are imparted to the cross-beam 18, carrying the plunger 8ª, which is regulated by swivel-screws 20, having right and left handed threads, by means of which the pressure to be produced on the molding mass is regulated at will. On the same shaft 15 are secured cams 21, which operate levers 22, Fig. 3, which levers are connected to connecting-rods 23 on the levers 23$^b$, united at their ends with rods 17$^d$. The latter are hinged at the ends of a cross-bar 24, which carries the cover 7ª of the molds, as hereinafter more fully described, the pressure of which cover is also regulated by means of the swivel-screws 20, provided with right and left handed threads. As may be seen from the above, one and the same cover is sufficient for the six molds, being made hollow or provided with a passage 59, Figs. 2, 3, 7, and 9, necessary for the circulation of cooling-water, so as to be kept cooled to the required degree, as hereinafter more particularly set forth. The cams 21 are so shaped and located on the shaft 15 that the cover is set onto the mold at the proper moment, is kept steadily on it during the time of pressure on the part of the plunger, and lifted when the matter leaves the mold. The shaft 15 rotates in the direction of the arrow in Fig. 3ª. The cover is adapted to assume its lowermost position before and leave it after the plunger leaves its lowermost position, this being effected by the respective actions of the crank-pins 16$^d$ and the cams 21. In order to effect the lifting of these parts, counterweights 26 are provided, the same being carried on levers 27, fulcrumed on pivots 28, which screw-caps 29 carry, said screw-caps being adapted to secure in place a stationary cross piece or brace 30 for four standards 31, that serve as guides for the cross-pieces 18 and 24. Said standards are secured in the frame by keys 32ª at their bases. These counterweights may not always act to lift the cover (which, it is to be observed, has no other means but these for effecting its elevation) on account of adhesion between the latter and the molded article, for instance, and so I employ the projecting portions 32 of the cam-plates 16 to wipe against rollers 33 on the connecting-rods 23 to positively produce the proper action.

The intermittent rotation of the table is effected by a special device 34 and 35, Fig. 1ª, by which the necessary movement is exactly carried out, and it is rendered impossible that the table should ever deviate from its true position relatively to the molds whatever be the rate at which the machine is being worked. The application of this intermittent movement is of the greatest importance when it is desired to secure a rapid and regular working without fear of disarrangements. The circular plate 35 is actuated by the endless screw 14$^b$, engaging with the toothed wheel 14$^c$, secured on the same shaft 14$^d$ as is the plate 35, and whenever the tooth 36 of said plate 35 engages in a notch 34$^b$ on the intermittent plate 34 the movement of the table 3 is effected, since the intermittent plate 34 is secured on the same shaft as the mold-carrying table 3. The periphery of the plate 35 is kept in continual rotation by the endless screw 14$^b$, which turns in one of the six notches the curve of which is of the same radius as that of the plate 35. It strikes, therefore, during the whole of its movement against the intermittent plate 34. Under these conditions the molds 4 are brought with mathematical precision under the centers of the cover and the plunger, the adjustment of which had previously been secured by means of the cone 2ª. On the same shaft 15 is also secured a cam 38 for working a lever 39, moving around its axis 39ª and so actuated as to raise at the desired moment a rod 40, which by lifting a loose block 6$^d$ in the mold and hereinafter described releases the molded article after having been left sufficiently long in the mold to require the necessary consistence so as to retain its shape—say at every second or fourth displacement of the table 3. The articles thus set free and raised are taken up by a fork and placed on an endless belt lined with asbestos, and by this belt they are automatically taken to the place where they are polished or annealed. I may here observe that such method of automatic transport by means of a belt is not new in itself, I having invented it many years ago in connection with a molding-machine. This former belt was intended to receive the molded articles and to transfer them to a certain place where they were required. The belt was, however, not lined or faced with asbestos, nor was the latter employed in any way for the preservation of the belt, which special features are peculiar to the belt which I employ in connection with my present machine, it being possible by use of it to transfer the red-hot articles coming out of the molds directly to the chamber where they are annealed or to the place where they are polished by tar or mineral essence being sprayed into the furnace by means of air or steam or being fed by gazogenes with carbon flames, all these operations being too well known to require description. I have also used for a long time past endless chains for carrying articles automatically through the annealing-chamber.

The lowering of the rod after the mold has been emptied may be effected by any means—for instance, by a spring 40ª, Figs. 2 and 3, surrounding the rod 40, which may press against the socket of the frame 40$^b$ and against the shoulder 40$^c$ of the rod 40. A cam 41, Fig. 3ª, oscillates the vertical shaft 42 by means of a rod 43 and rollers 44. The cam 41 is so arranged as to hold the lever 45 stationary during the operation of molding. It is only when the cover and plunger are elevated and the table has brought up an empty mold that the cam liberates the connecting-rod 43, which is drawn by the spring 46, Fig. 2. When the shaft 42 is turned or oscillated, it moves a lever 47, carried at its upper end and having a coupling 49, which in turn actuates a lever 50, to which it is connected and to which a distributer-gage $50^a$, hereinafter to be described, is fixed. The latter is fixed between the feeding-funnel 51 and lever 52, which carries an elongated bottom plate $52^a$. The two levers 50 and 52 move on one of the guides 31 and rest on a ring 53, which is adapted as to height by means of screw-bolts $53^a$. The funnel is stationary, being fixed to the frame of the machine by a support 54. The bottom lever 52, as well as the top lever 50, is moved by the lever 47, the operation being very simple. The levers 47 and 52 have different radii and axes. Consequently, since the end $47^a$ of the lever 47 is engaged between the projection $52^d$ of lever 52 and an elastic stop 57 thereon, as the lever 47 moves inwardly it leaves the latter, and after moving the lever 52 up to the mold it continues its movement in order to empty the contents of the distributer 50 into the mold 4. The return of the lever 47 after the contents of the distributer are discharged being immediately effected by the cam 41 in case the bottom lever 52 should by an accidental blow or otherwise recede before the said lever 47 could meet its projection $52^d$, to thereby force it back, said lever 47 can assume its initial position upon its simply pressing back the stop 57 in passing. The latter is rendered elastic by a spring 58 in the lever 52.

It should be here remarked that the molten glass is placed from the spoon or ladle into the distributer $50^a$ when the latter is in the position relatively to the funnel and the bottom plate 52. (Indicated in Fig. 7.) The distributer is provided with a projecting lip or flange $13^d$. As the distributer moves inwardly the superfluous portion of the molten mass of glass which extends up into the funnel is cut off as by a pair of shears, a bottom being provided for the funnel in the top of the moving distributer and its lip or flange, so that the mass of glass is kept from falling out. The glass in the distributer is emptied when the latter carries it to a position over the mold and beyond the edge of the bottom plate $52^a$, which, as above stated, ceases to move just before reaching the mold.

The means employed for heating and cooling the molds, the cover, and the plunger will now be described, which will be clear on referring to the drawings Figs. 2, 3, 5, 6, and 7. The molds, cover, and plunger have hollow spaces 59 formed within the thickness of their walls, these spaces or chambers 59 being provided to allow cooling-water to circulate during the work of molding or for applying heating-steam before molding has actually begun. The change can be rapidly carried out by means of tubes 60, which can be easily connected to the flexible tubes through which water is introduced or to the flexible tube 62, by which steam is admitted. The two flexible tubes are provided with closing-taps. The distributing-tubes 64, Figs. 3, 6, and 7, are provided with taps 65 and 66 to allow of the admission of water and steam at will from one side to the other, and thus to cause the molds, the cover, and the plunger to be of the same temperature. The molds may be formed with or without cross-bars, the water entering at the lower end and leaving the mold at the upper end of the channel. In order to feed the covers which pass through a long vertical movement, the molds and the plungers, jointed tubes 67, or tubes of flexible metal are employed. The discharge is by similar tubes—i. e., by flexible metal tubes $67^a$—one end of which is in communication with the upper end of the passage, while the other communicates with a reservoir 68, receiving the heated water. In order to be able to feed the molds placed on the circular table and actuated by a circular motion, recourse has been had to a special arrangement, the use of which is hereby reserved. All the passages 59 in the walls of the molds are connected by metallic tubes 69, Figs. 1, 2, and 3, by means of unions 70 into a central tubular part 71 in the center of the axis of the circular table 3. This tubular part receives a central tube 72, the upper end of which terminates in a cone 73, provided with grooves 74 to permit the entrance of the water into the central tube. This conical-ended rod, shaped like a tap-spindle, engages in the case 74 with the tube 64, which is held stationary in supports 75. The discharge of the hot water or steam is effected through tubes 76, connected at the upper part with the channel 59 and at the other end to a tubular part 77, forming part of the discharging-tube 78, which ends in an enlargement from which the water enters the reservoir 68, provided with a discharge-tube 79. Between the admission-tubes and the discharge-tube there is an intermediate tube 80 to prevent the discharging hot water from raising the temperature of the cooling-water which descends down the central tube for the purposes of cooling the molds. This reservoir 68 is fixed to the upper cross-bar 30 by bolts passing through the flange of support $30^a$.

Figs. 4 and 5 show in plan and vertical section, detached from the machine, the mold provided with its cover and plunger on a scale of one-half of its natural size in order to be able to better show the combination of the conduits and chambers destined to receive both the steam for the heating before work actually begins and cold water to maintain the required degree of temperature during the work. The mold 4, illustrated detached from its carrying-table, is intended to mold glass trays or baskets. As can be seen, the conduit 59 conforms approximately to the outer wall of the basket, leaving a narrow thickness of metal 5°, so that the water may easily cool the walls of the mold. The supply of fluid is effected by means of the metallic tube 69, attached by screw-sockets 70, and the discharge is by a similar tube 76, Fig. 3, attached by a similar socket 77. A block 6$^d$ for forming the bottom of the basket of a suitable ornamental shape serves to detach the basket when sufficiently cooled by means, as explained before, of the rod 40. The molded articles thus lifted from their molds are taken by means of a fork and deposited on an endless band or chain lined with asbestos, which passes by the machine, passing on slowly to the polishing and annealing oven without the articles leaving the chain before they are annealed after polishing. The cover 7$^a$ is fixed by means of bolts 84$^e$ to an integral plate 84$^a$, that projects forwardly under the cross-bar 18 from the lower end of a piston 84. The latter moves in a central sleeve 24$^a$ of the cross-beam 24 and is actuated by a spring 83, Fig. 8, disposed between the upper end of said piston and an abutment 85, screwed into the sleeve 24$^a$, said spring being coiled about an integral reduced extension 85$^a$ of the piston, to the upper end of which is attached a stop 85$^b$ for limiting the downward movement of said piston. The said cover is also provided with its own cooling-chamber 59 and is adapted to close the molds and to form the border of the basket. It has two projections 86$^a$ and fits intor ecesses formed in the mold, so that these two parts should always exactly correspond in order that the lines of the design of the basket should always properly fit and correspond. The supply of fluid of the cooling-chamber is effected by means of metallic flexible tubes 62, connected to the cover by screw-sockets 61, the discharge being effected by another tube of the same kind, 60, provided with a similar fitting. The plunger 8$^a$ is also provided with its cooling-chamber, closed at its upper end by a stopper or cap 9$^a$, which plunger engages into the central sleeve 18$^a$ of the cross-bar 18, said sleeve being closed at its lower portion by the piston 10$^a$, Fig. 3, which latter is held down by the spring 83$^e$ bearing against an abutment 11$^a$. This plunger is kept at the proper temperature by means of two tubular parts 86, pivoted in said plunger and serving, as stated, the one for the introduction of cold water or steam and the other for the discharge of hot water. The union is easily effected by means of two screw-sockets. The place for the location of the tubes for the water or steam and of the discharging-tubes may conveniently be chosen according to the situation of the reservoir in use. Of course they ought always to be so arranged as not to interfere with the movement of the workmen or that of the endless band, which operates the machine.

Figs. 6 and 7 illustrate in plan and section on a scale one-half of the natural size separately from the machine the charge-distributer 50$^a$, with its conduit 59. The upper part 51, attached to the support 54, Figs. 2 and 3, by the branch 51$^c$, is provided with a funnel-shaped mouth 51$^a$, by which the glass is easily poured into the receiver 51$^b$ of the distributer 50$^a$. This receiver will have the dimensions corresponding with the exact quantity required for the article it is intended to produce. The distributer 50$^a$ is a simple box of cast-iron provided with a tailpiece 50$^c$, Fig. 6, by means of which it is attached to the actuating-lever, and is cast with its water-conduit 59 surrounding the receiving-funnel 51$^b$. This part of the machine is of a construction far from costly. The chamber receiving the substance to be molded ought always to be properly cleansed with energy and its two faces polished. Of course it will be easily understood that a different part 50$^a$ will be required for every different quantity of material. The bottom plate 52, on which rests the material contained in the receiver 51$^b$, is also of iron cast in one with its water-chamber 59, so as to be kept at a constant temperature which will not chill the glass and will at the same time prevent the metal from getting red-hot. As has been explained before, any excess quantity of glass is cut off, remaining in the funnel 51$^a$, and may be taken up by the spoon as the distributer moves on to drop its charge into the mold. This part 52 advances with the distributer 50$^a$, as heretofore set forth, until it is just above a mold, when it stops, the molten glass falling as soon as the opening of the receiver 51$^b$ passes over the edge 17$^a$ of the part 52, provided the distributer 50$^a$ continues its movement until the edge 18 of the receiver has passed beyond the extreme point 17$^a$. The supply of fluid to the conduits 59 is effected by the flexible metal tubes 63 and the attachment 61 and the discharge by means of a tubular part 64 and tubes and attachments similar to those already described.

The covers, plungers, and molds used in the manufacture of these vessels or cups may be provided with chambers for cooling them or for heating them—*i. e.*, if articles are made from plastic earth, &c.—whenever it may be deemed necessary.

Having thus fully described my invention, what I claim as new, and desire to secure by Letters Patent, is—

1. In a molding-machine, the combination, with the frame and with a revoluble shaft journaled in said frame and provided at each end with a worm, of a rotary table mounted in said frame, power-transmitting means operatively connecting said table and the worm at one end of said shaft, another shaft journaled in said frame and having operative connection with the worm at the other end of said first-named shaft, molds, portions of said molds being carried by the table, a reciprocating element or elements carrying the other portions of said molds and arranged in operative disposition relatively to the table, and operative connection between said element or elements and said last-named shaft, substantially as described.

2. In a molding-machine, the combination, with the frame and with a revoluble shaft journaled in said frame and provided at each end with a worm, of a rotary table mounted in said frame, intermittently-actuative power-transmitting means operatively connecting said table and the worm at one end of said shaft, another shaft journaled in said frame and having operative connection with the worm at the other end of said first-named shaft, molds, portions of said molds being carried by the table, a reciprocating element or elements carrrying the other portions of said molds and arranged in operative disposition relatively to the table, and operative connection between said element or elements and said last-named shaft, substantially as described.

3. In a molding-machine, the combination, with the frame and with a revoluble shaft journaled therein, of a table mounted in said frame, means for intermittently rotating said table, molds, portions of said molds being carried by the table,. reciprocating cross-pieces disposed above said table and carrying the other portions of said molds, rods connecting one of said cross-pieces and said shaft and having eccentric engagement with the latter, cams carried by said shaft, systems of interconnected levers connected to the other cross-piece and adapted to be engaged by said cams to be depressed thereby, and other cams carried by said shaft and adapted to engage said systems of levers to elevate the same, substantially as described.

4. In a molding-machine, the combination, with the frame, vertical guides mounted thereon, and a revoluble shaft journaled in said frame, of a table mounted in said frame, means for intermittently rotating said table, molds, portions of said molds being carried by the table, reciprocating cross-pieces engaging said guides, carrying the other portions of said molds and having eccentric engagement with the shaft, cams carried by said shaft, systems of interconnected levers connected to the other cross-piece and adapted to be engaged by said cams to be depressed thereby, other cams carried by said shaft and adapted to engage said systems of levers to elevate the same, and counterweights controlling said cross-pieces, substantially as described.

5. In a molding-machine, the combination, with the frame and with driving means mounted therein, of an intermittently-rotative table mounted on said frame, operative connecting means between said table and the driving means, molds, portions of said molds being carried by said table, an oscillatory shaft, an intermittently-actuative filling mechanism comprising a movable receptacle, and an independently-movable bottom for said receptacle having operative connection with said shaft, and operative connecting means between said shaft and the driving means, substantially as described.

6. In a molding-machine, the combination, with the frame and with driving means mounted therein, of an intermittently-rotative table mounted on said frame, operative connecting means between said table and the driving means, molds, portions of said molds being carried by the table, a shaft journaled in said frame and carrying a cam, an oscillatory shaft, spring-controlled actuating means for said shaft operatively connected to the same and engaging said cam, and a filling mechanism operatively connected to said oscillatory shaft, substantially as described.

7. The combination, with a suitable support, of an operatively-sustained mold, a funnel sustained on said support, a plate disposed between said support and the funnel, and a lever movable and snugly fitting between said funnel and the plate and provided with an opening through the same adapted to register with the funnel, said mold being disposed in the line of movement of said opening, substantially as described.

8. The combination, with a suitable support, of an operatively-sustained mold, a funnel sustained on said support, a plate disposed and movable between said funnel and the support, and a lever movable and snugly fitting between said funnel and the plate and provided with an opening through the same adapted to register with the funnel, said mold being disposed in the line of movement of said funnel, and said lever and the plate having disconnective engagement with each other, substantially as described.

9. In a molding-machine, the combination, with the frame and with a revoluble shaft journaled therein, of a table mounted in said frame, means for intermittently rotating said table, molds, portions of said molds being carried by the table and having loose bottoms, reciprocating cross-pieces sustained above said table and carrying the other portions of said molds, rods connecting one of said cross-pieces and said shaft and having eccentric engagement with the latter, cams carried by said shaft, systems of interconnected levers connected to the other cross-piece and adapted to be engaged by said cams to be depressed thereby, other cams carried by said shaft and adapted to be engaged by said system of levers to elevate the same, a reciprocating device adapted to actuate the movable bottoms of said molds, and operative connecting means between said device and the shaft, substantially as described.

In testimony that I claim the foregoing I have hereto set my hand this 13th day of March, 1899.

JEAN BAPTISTE FONDU.

Witnesses:
CHARLES NONOLD,
GREGORY PHELAN.